106. COMPOSITIONS, COATING OR PLASTIC.

Patented May 8, 1928.

1,668,768

UNITED STATES PATENT OFFICE.

LOUIS H. HARTUNG AND FREDERICK FOLBERT, OF DETROIT, MICHIGAN.

METHOD OF MAKING MOLDED PRODUCT.

No Drawing. Original application filed June 26, 1924, Serial No. 722,541. Divided and this application filed January 9, 1925. Serial No. 1,502.

This invention has reference to molded products which may be fastened in a great variety of forms for a number of purposes and act as a substitute for wood fiber, papier mâché, sheet or block materials, and when so fashioned have or be capable of being provided with a highly glossed finish, the said molded product involving in its manufacture the utilization of an amphibole composition such as that described in our pending application for Letters Patent, Serial No. 722,541, filed on the 26th day of June, 1924, of which this application is a division.

The object of the said invention is to provide a molded product which will not be liable to chipping or abrasion and which will offer greater resistance against being bent or dented than sheet metal of equal thickness, the said product being also impervious to corrosive climatic effects having marked fire resisting qualities, being substantially water proof, light in comparison with its bulk, as compared with sheet metal, and lending itself to its being coated with materials such as porcelain, due to its fire resisting qualities and the fact that such materials may be burned on the surface thereof without seriously affecting the said molded product.

The composition utilized is essentially asbestos or amphibole material combined with suitable binders, water proofing agents or hardening agents in a manner producing a substance which is not heavy or of a fragile or brittle nature, as is the case with amphibole compositions as heretofore known, or subject to crumbling or disintegration, or of a highly absorbent nature requiring to be sized or painted with a water proof coating as in the case of such former amphibole compositions. The said molded product may be produced in the form of automobile parts, panels, doors, casings, furniture, and so on, of a most durable nature and capable of being finished in almost any suitable manner which may be desirable.

The composition of matter entering into the production of the said molded product is secured by the treatment of amphibole together with other materials as hereinafter specified with chloride of zinc in the presence of soap or resin (herein and in the claims appended hereto the terms "soap" and "resin" being interchangeable) whereby the chloride of zinc in the presence of the soap unites with the silicate of soda present in the amphibole forming an insoluble compound which reduces the porosity and effects a partial waterproofing of the material.

Together with the amphibole, to give both bulk and density to the produced material, we prefer to use magnesite and diatomaceous earth, and we also propose to use in the composition aluminum sulphate together with the chloride of zinc as a binding material, and also silicate of soda or potassium silicate as penetrating hardening mediums. These water proofing and hardening materials may be added to the partly completed composition in various stages interspersed with drying or baking of the partly completed composition; or the composition may be considered as completed at any of these stages according to the quality of hardness or water proof nature of the material desired or required by the purposes to which it is to be put to use.

As an example of a method of carrying said invention into effect, we may provide, by weight, amphibole fourteen parts; magnesite fourteen parts, and diatomaceous earth twenty parts, to which is added two parts of chloride of zinc, one part of aluminum sulphate, one part of soap and seven parts of silicate of soda. These are thoroughly mixed together with sufficient water to form a heavy dough from which surplus water is afterwards filtered. The residue is then placed in molds or subjected to pressure by rolling or otherwise. This pressure may conveniently be within two hundred and fifty and three hundred pounds to the square inch to obtain a sufficient compression of the internal structure of the material to bring the binders and the several ingredients of the composition into close relation with one another, the compressed material being released after a sufficient lapse of time for the pressure to have taken effect and thereafter placed in a drying kiln or oven having a temperature of preferably ninety to one hundred and ten degrees Fahrenheit in which kiln it is thoroughly dried. The dried material is then subjected to a bath of strong solution of soap in hot water for several hours and again dried.

To give the material a protective surface film, and to stiffen it in its molded or pressed shape, we may next subject it to a bath containing a twenty per cent solution of calcium chloride for a sufficient length of time to permit the calcium chloride to form with the soap in the composition an insoluble compound effectually closing the surface pores of the material to render it waterproof and form the stiffening film referred to; and after again drying the material it may be placed in a further bath comprising a twenty per cent solution of sodium or potassium silicate which penetrates the material and effects the reducing of the same to a hard rock-like structure but without the same fragility which characterizes such materials as cement and asbestos-cement sheets.

Any further treatment of resin soap, followed after drying with a solution of calcium chloride to form an insoluble compound on the surface and in the pores of the material, may be employed to increase the water proofing thereof to any desired extent; and, where the material is intended to withstand high temperatures, still further treatments of silicate of soda or potassium silicate may be given.

The material is also of such a nature that it may be coated with porcelain, which can be burned on the surface thereof without seriously effecting the material.

It will be obvious that the arrangement and proportions of the ingredients of this composition may be varied from the essential features of the said invention, and it is therefore desired that the example set forth herein shall be regarded as being merely illustrative and not in a limiting sense, except as necessitated by the prior art.

What we claim is:—

1. The method of producing a molded product of amphibole characteristic which consists in preparing a moldable material which includes amphibole with its silicate content as one of the dominating ingredients of the material, the material being treated with chloride of zinc in the presence of soap to produce a treatment reaction of the chloride, soap and silicate content, and with the treatment reaction made manifest throughout the mass of the material, fashioning the material into an embryo product under pressure, heating and drying the embryo product, and then subjecting the surface of the dried embryo product to a soap solution to deposit the salts from the surface of the embryo product to develop the latter in the direction of the final product form.

2. The method set forth in claim 1 characterized in that the bulk and density of the embryo product is provided by the use of magnesite and diatomaceous earth as other dominating ingredients of the material being treated, the treatment reaction by the chloride, soap and silicate content of the amphibole being effective in producing the density characteristic in the presence of pressure.

3. The method set forth in claim 1 characterized in that other ingredients of the material being treated are magnesite and diametaceous earth in similar dominating values, together with aluminum sulphate and silicate in proportional values relatively minor with respect to the values of the dominating ingredients, to produce the bulk and density producing elements of the material in advance of the fashioning of the embryo product and to provide the binding and hardening characteristic to the material during the admixture of the ingredients prior to the fashioning of the embryo product.

4. The method set forth in claim 1 characterized in that the relative proportions of amphibole, chloride of zinc and soap are respectively fourteen parts (by weight), two parts and one part, the silicate content value of the amphibole being dependent on the value present within the amphibole, with other binders and hardening agents introduced into the material admixture prior to the fashioning of the embryo product.

5. The method set forth in claim 1 and wherein the embryo product is subjected to a further treatment with a solution of sodium or potassium silicate followed by subsequent drying at temperatures about 100° F.

6. The method set forth in claim 1 characterized in that the drying temperatures are not less than 90° and not greater than 120° F.

7. The method set forth in claim 1 characterized in that the dried embryo product is then subjected to a bath containing a 20% solution of calcium chloride to react with the soap in closing the product pores at the surface, and subjecting the treated embryo product to the drying activity to produce a stiffening film characteristic to the surface zone of the product.

8. The method set forth in claim 1 characterized in that the dried embryo product is further developed by producing a stiffening film within the surface zone of the product by subjecting the dried product to a bath of 20% solution of calcium chloride and subsequent drying activity, and a succeeding treatment by a bath of 20% solution of sodium or potassium silicate to further harden the same.

In testimony whereof we affix our signatures.

LOUIS H. HARTUNG.
FREDERICK FOLBERT.